United States Patent
Shi et al.

(10) Patent No.: US 9,258,519 B2
(45) Date of Patent: Feb. 9, 2016

(54) ENCODER ASSISTED FRAME RATE UP CONVERSION USING VARIOUS MOTION MODELS

(75) Inventors: Fang Shi, San Diego, CA (US); Seyfullah Halit Oguz, San Diego, CA (US); Sumeet Singh Sethi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2998 days.

(21) Appl. No.: 11/527,304

(22) Filed: Sep. 25, 2006

(65) Prior Publication Data

US 2007/0071100 A1    Mar. 29, 2007

Related U.S. Application Data

(60) Provisional application No. 60/721,375, filed on Sep. 27, 2005, provisional application No. 60/721,376, filed on Sep. 27, 2005.

(51) Int. Cl.
| | | |
|---|---|---|
| *H04N 7/32* | (2006.01) | |
| *H04N 7/12* | (2006.01) | |
| *H04N 11/04* | (2006.01) | |
| *H04N 11/02* | (2006.01) | |
| *G06K 9/36* | (2006.01) | |
| *H04N 7/01* | (2006.01) | |
| *H04N 19/46* | (2014.01) | |
| *H04N 19/61* | (2014.01) | |
| *H04N 19/132* | (2014.01) | |
| *H04N 19/137* | (2014.01) | |
| *H04N 19/44* | (2014.01) | |
| *H04N 19/23* | (2014.01) | |
| *H04N 19/527* | (2014.01) | |

(Continued)

(52) U.S. Cl.
CPC .......... *H04N 7/0137* (2013.01); *H04N 19/132* (2014.11); *H04N 19/137* (2014.11); *H04N 19/23* (2014.11); *H04N 19/44* (2014.11); *H04N 19/46* (2014.11); *H04N 19/521* (2014.11); *H04N 19/527* (2014.11); *H04N 19/537* (2014.11); *H04N 19/543* (2014.11); *H04N 19/577* (2014.11); *H04N 19/587* (2014.11); *H04N 19/61* (2014.11)

(58) Field of Classification Search
USPC ..................................... 375/240.16
See application file for complete search history.

(56) References Cited

U.S. PATENT DOCUMENTS 5,557,684 A * 9/1996 Wang et al. .................. 382/107
6,163,575 A * 12/2000 Nieweglowski et al. 375/240.16

(Continued)

OTHER PUBLICATIONS

Co-pending U.S. Appl. No. 60/721,376, filed Sep. 27, 2005.

(Continued)

*Primary Examiner* — Hee-Yong Kim
(74) *Attorney, Agent, or Firm* — Arent Fox LLP (57) ABSTRACT

An Encoder Assisted Frame Rate Up Conversion (EA-FRUC) system that utilizes various motion models, such as affine models, in addition to video coding and pre-processing operations at the video encoder to exploit the FRUC processing that will occur in the decoder in order to improve the modeling of moving objects, compression efficiency and reconstructed video quality. Furthermore, objects are identified in a way that reduces the amount of information necessary for encoding to render the objects on the decoder device.

20 Claims, 7 Drawing Sheets

(51) Int. Cl.
*H04N 19/537* (2014.01)
*H04N 19/543* (2014.01)
*H04N 19/587* (2014.01)
*H04N 19/577* (2014.01)
*H04N 19/513* (2014.01)

(56) References Cited

U.S. PATENT DOCUMENTS

| | | | |
|---|---|---|---|
| 6,385,245 B1 | 5/2002 | De Haan et al. | |
| 6,553,069 B1* | 4/2003 | Shin et al. | 375/240.14 |
| 6,618,439 B1* | 9/2003 | Kuo et al. | 375/240.16 |
| 7,095,786 B1* | 8/2006 | Schonfeld et al. | 375/240.16 |
| 7,558,320 B2* | 7/2009 | Winder et al. | 375/240.12 |
| 2003/0202596 A1* | 10/2003 | Lainema et al. | 375/240.16 |
| 2004/0027454 A1 | 2/2004 | Vella et al. | |
| 2005/0125108 A1 | 6/2005 | Kwon et al. | |
| 2006/0002465 A1* | 1/2006 | Raveendran et al. | 375/240.01 |
| 2006/0165176 A1* | 7/2006 | Raveendran et al. | 375/240.16 |

OTHER PUBLICATIONS

International Search Report and Written Opinion—PCT/US2006/037997, International Searching Authority—European Patent Office, Mar. 28, 2007 (050878).

\* cited by examiner

ENCODER ASSISTED FRAME RATE UP CONVERSION USING VARIOUS MOTION MODELS

CROSS-REFERENCE TO RELATED APPLICATIONS

The present Application for Patent claims priority to (a) Provisional Application No. 60/721,375 entitled "A METHOD OF ENCODER ASSISTED FRAME RATE UP CONVERSION WITH DIFFERENT MOTION MODELS" and filed Sep. 27, 2005 and (b) Provisional Application No. 60/721,376 entitled "A METHOD AND APPARATUS FOR ENCODER ASSISTED FRAME RATE UP-CONVERSION" and filed Sep. 27, 2005, both of which are hereby expressly incorporated by reference herein.

BACKGROUND

1. Field

This disclosure is directed to a method and an apparatus for encoding video data.

2. Description of the Related Art

Video formats supporting various frame rates exist today. The following formats are currently the most prevalent, listed in order by their supported frames per second (fps): 24 (film native), 25 (PAL), 30 (typically interlaced video), and 60 (High Definition (HD) e.g. 720p). Although these frame rates are suitable for most applications, to reach the low bandwidth required for mobile handset video communications, frame rates are sometimes dropped to rates as low as 15, 10, 7.5, or 3 fps. Although these low rates allow low end devices with lower computational capabilities to display some video, the resulting video quality suffers from "jerkiness" (i.e., having a slide show effect), rather than being smooth in motion. Also, the frames dropped often do not correctly track the amount of motion in the video. For example, fewer frames should be dropped during "high motion" video content portions such as those occurring in sporting events, while more frames may be dropped during "low-motion" video content segments such as those occurring in talk shows. Video compression is content dependent, and it would be desirable to be able to analyze and incorporate motion and texture characteristics in the sequence to be coded so as to improve video compression efficiency.

Frame Rate Up Conversion (FRUC) is a process of using video interpolation at the video decoder to increase the frame rate of the reconstructed video. In FRUC, interpolated frames are created using received frames as references. Currently, systems implementing FRUC frame interpolation (hereinafter "interpolated frames") include approaches based on motion compensated interpolation and the processing of transmitted motion vectors. FRUC is also used in converting between various video formats. For example, in Telecine and Inverse Telecine applications, which is a film-to-videotape transfer technique that rectifies the respective color frame rate differences between film and video, progressive video (24 frames/second) is converted to NTSC interlaced video (29.97 frames/second).

Another FRUC approach uses weighted-adaptive motion compensated interpolation (WAMCI), to reduce the block artifacts caused by the deficiencies of motion estimation and block based processing. This approach is based on an interpolation by the weighted sum of multiple motion compensated interpolation (MCI) images. The block artifacts on the block boundaries are also reduced in the proposed method by applying a technique similar to overlapped block motion compensation (OBMC). Specifically, to reduce blurring during the processing of overlapped areas, the method uses motion analysis to determine the type of block motion and applies OBMC adaptively. Experimental results indicate that the proposed approach achieves improved results, with significantly reduced block artifacts.

Yet another FRUC approach uses vector reliability analysis to reduce artifacts caused by the use of any motion vectors that are inaccurately transmitted from the encoder. In this approach, motion estimation is used to construct motion vectors that are compared to transmitted motion vectors so as to determine the most desired approach for frame interpretation. In conventional up-conversion algorithms using motion estimation, the estimation process is performed using two adjacent decoded frames to construct the motion vectors that will allow a frame to be interpolated. However, these algorithms attempt to improve utilization of transmission bandwidth without regard for the amount of calculation required for the motion estimation operation. In comparison, in up-conversion algorithms using transmitted motion vectors, the quality of the interpolated frames depends largely on the motion vectors that are derived by the encoder. Using a combination of the two approaches, the transmitted motion vectors are first analyzed to decide whether they are usable for constructing interpolation frames. The method used for interpolation is then adaptively selected from three methods: local motion-compensated interpolation, global motion-compensated interpolation and frame-repeated interpolation.

Although FRUC techniques are generally implemented as post-processing functions in the video decoder, the video encoder is typically not involved in this operation. However, in an approach referred to as encoder-assisted FRUC (EA-FRUC), the encoder can determine if transmission of certain information related to motion vectors or references frames (e.g., residual data), may be eliminated while still allowing the decoder to autonomously regenerate major portions of frames without the eliminated vector or residual data. For example, a bidirectional predictive video coding method has been introduced as an improvement to B-frame coding in MPEG-2. In this method, the use of an error criterion is proposed to enable the application of true motion vectors in motion-compensated predictive coding. The distortion measure is based on the sum of absolute differences (SAD), but this distortion measure is known to be insufficient in providing a true distortion measure, particularly where the amount of motion between two frames in a sequence is to be quantified. Additionally, the variation in thresholds are classified using fixed thresholds when, optimally, these thresholds should be variable as the classifications are preferably content dependent.

FRUC video compression techniques, including those employing encoder enhanced information, use block-based motion prediction with translational motion models to model the motion of objects within video frames. Block-based motion prediction exploits the temporal correlation structure inherent to video signals. Translational motion modeling as used by block-based motion prediction may reduce or eliminate temporal redundancy in video signals for bodies which retain a rigid shape while going through translational motion in a plane more or less parallel to the lens of the video capturing device. The translational motional model uses two parameters per encoded block.

In motion-compensated prediction and transform coding based hybrid video compression, video frames are partitioned by conventional encoders according to use of the translational motion model, where partitions are generated in order to locate object bodies retaining a rigid shape while undergoing translational motion. For example, a video sequence of a person talking to the camera while a car passes by may be partitioned into objects including a still image representing a fixed background for the sequence, a video object representing the talking person's head, an audio object representing the voice associated with the person, and another video object representing the moving car as a sprite with a rectangular region of support. The location of the sprite on the still image may move temporally.

Unfortunately, translational model motion prediction cannot accurately predict or describe motion for objects in motion requiring more than two parameters per block. Independently moving objects in combination with camera motion and focal length change lead to a complicated motion vector field that has to be approximated efficiently for motion prediction. Consequently, the residual signal (also known as the prediction error) has considerable power and therefore video frames containing such movement are not efficient to compress. When video frames containing such objects are interpolated using block-based motion prediction, both the subjective and objective quality of the interpolated frame is low due to the limitations of the translational motion model framework to describe block motion dynamics. Furthermore, when video sequences are partitioned according to translational model motion prediction, the efficiency of algorithms which handle the interpolations of objects undergoing arbitrary motion and deformations is limited.

What is desirable is an approach that provides high quality interpolated frames at the decoder device that appropriately model moving objects while decreasing the amount of bandwidth potentially needed to transmit the information for performing the interpolation, and that also decrease the volume of calculation potentially needed to create these frames so as to make it well suited to multimedia mobile devices that depend on low-power processing.

SUMMARY

Certain aspects disclosed herein provide an Encoder Assisted Frame Rate Up Conversion (EA-FRUC) system that utilizes various motion models in addition to video coding and pre-processing operations at the video encoder to exploit the FRUC processing that will occur in the decoder in order to improve the modeling of moving objects, compression efficiency and reconstructed video quality.

In one aspect, a method of processing multimedia data is disclosed. The method comprises dividing at least one of first and second video frames into a plurality of partitions, determining modeling information for at least one object in at least one of the partitions, said modeling information being associated with the first and second video frames, generating an interpolated frame based on the modeling information, and generating encoding information based on the interpolated frame, wherein the encoding information is used for generating a video frame temporally co-located with the interpolated frame.

In another aspect, an apparatus for processing multimedia data is disclosed. The apparatus comprises means for dividing at least one of first and second video frames into a plurality of partitions, means for determining modeling information for at least one object in at least one of the plurality of the partitions, said modeling information being associated with the first and second video frames, means for generating an interpolated frame based on the modeling information, and means for generating encoding information based on the interpolated frame, wherein the encoding information is used for generating a video frame temporally co-located with the interpolated frame.

In a further aspect, an apparatus for processing multimedia data is disclosed. The apparatus comprises a partitioning module configured to divide at least one of first and second video frames into a plurality of partitions, a modeling module configured to determine modeling information for at least one object in at least one of the plurality of the partitions, said modeling information being associated with the first and second video frames, a frame generation module configured to generate an interpolated frame based upon the modeling information, an encoding module configured to generate encoding information based upon the interpolated frame, and a transmission module configured to transmit the encoding information to a decoder.

In yet another aspect, a machine readable medium comprising instructions for processing multimedia data is disclosed. The instructions upon execution cause a machine to divide at least one of first and second video frames into plurality of partitions, determine modeling information for at least one object in at least one of the plurality of the partitions, said modeling information being associated with the first and second video frames, generate an interpolated frame based on the modeling information, and generate encoding information based on the interpolated frame, wherein the encoding information is used for generating a video frame temporally co-located with the interpolated frame.

In another aspect, a processor for processing multimedia data is disclosed. The processor is configured to divide at least one of first and second video frames into a plurality of partitions, determine modeling information for at least one object in at least one of the plurality of the partitions, said modeling information being associated with the first and second video frames, generate an interpolated frame based on the modeling information, and generate encoding information based on the interpolated frame, wherein the encoding information is used for generating a video frame temporally co-located with the interpolated frame.

Other objects, features and advantages will become apparent to those skilled in the art from the following detailed description. It is to be understood, however, that the detailed description and specific examples, while indicating exemplary aspects, are given by way of illustration and not limitation. Many changes and modifications within the following description may be made without departing from the spirit thereof, and the description should be understood to include all such modifications.

DETAILED DESCRIPTION

In one aspect of the encoder assisted-FRUC (EA-FRUC) system, as described herein, the encoder has access to the source frames as well as prior knowledge of the FRUC algorithm used on the decoder. The encoder is further configured to use various motion models, including translational motion models, to accurately model moving objects in the source frames. The encoder, using the interpolated frame generated therewith, transmits additional information to assist the decoder in performing FRUC and improve the decisions made during interpolation. Taking advantage of the knowledge that FRUC will be performed in the decoder, the EA-FRUC system utilizes various motion models, video coding and pre-processing operations at the video encoder to improve compression efficiency (thereby improving utilization of transmission bandwidth) and reconstructed video quality, including the representation of reconstructed moving objects. Specifically, various motion model information from the encoder, such as affine motion modeling, may supplement or replace information normally transmitted by the encoder that is provided to the decoder, so that the motion modeling information may be used in encoder assisted FRUC.

In one aspect, the information provided by the encoder includes such parameters as spatial (e.g., refinements, mode decisions, neighborhood characteristics) and temporal (e.g., motion vector(s) decisions) characteristics of the image to be interpolated at the decoder, as well as differential information with respect to normal predicted (B or P) frame coding and the interpolated frame generated by the FRUC process. The information provided by the encoder further includes various motion models selected to accurately and efficiently represent moving objects from the original video stream.

Several motion prediction techniques may be used for video compression in addition to translational motion. Additional motion types include: rotational motion; zoom-in and zoom-out motion; deformations, where changes in the structure and morphology of scene objects violate the assumption of a rigid body; affine motion; global motion; and object-based motion. Affine motion models support multiple motion types, including translational motion, rotational motion, shearing, translation, deformations and object scaling for use in zoom-in and zoom-out scenarios. The affine motion model is more versatile than the translational model because it incorporates these other motion types. The affine motion model uses six parameters per encoded block, accounting for rotation, scaling and shear. Thus, it allows for higher adaptability to actual dynamic motion of objects in a scene.

The object based motion prediction technique is used for video frames for a scene containing multiple objects going through different motion types. In these situations, no single motion model will be able to capture the different dynamics effectively, but instead a multitude of models may be used, where individual models are distinctly customized for each object in the scene.

Certain aspects of the encoder device discussed herein assess the properties of a decoder device that will be used to decode data encoded by the encoder device and optimizes encoding of the video data in order to improve the compression efficiency, performance and object rendering at the decoder device when interpolating frames. For example, the decoder device may improve FRUC or error concealment. In one aspect, video frames are partitioned into a collection of generally non-uniform sized and non-uniform shaped regions based behaviors, temporal change dynamics, or uniquely identifiable objects. According to certain aspects, the encoder device analyzes the video data (in segments of variable duration) in order to locate global motion. Where global motion is located, relevant model parameters and signals are estimated using various motion models, such as affine motion models. An affine motion model may then be created which describes the translational, rotational, scale and morphology change transformations for each object or partitions. The partition information along with the associated models may then be used to generate a prediction signal which may reduce the power of the residual signal. The partition map along with the associated model, including type and parameter information, gets transmitted to the decoder device. The residual signal may be separately compressed and also sent to the decoder device to enable a higher quality reconstruction. In certain aspects, the decoder device may then analyze the encoded data using information on the encoded motion model within a modified translational motion model framework.

Certain aspects describe a process for identifying objects which greatly reduces the amount of information necessary for encoding to render the objects on the decoder device. In some of those aspects, one background object and any number of foreground objects are identified using image segmentation, graph-based techniques, or scene composition information. The background object is then classified. Once the object based scene analysis comprising the above mentioned two steps is performed and completed on a sub-segment of the video sequence or on the entire video sequence, the evolution of each object and its dynamic behavior can be accurately described by an appropriate motion-deformation model. For example, for an object going through uniform translational motion, the entire trajectory can be simply described by a motion vector (normalized with respect to the nominal inter-frame duration). This information in conjunction with the visual data of a single snapshot of this object may be used to correctly render this object on a decoder device until the object moves out of the scene, or until some of its motion or visual attributes change. A change in one of the motion or visual attributes of the object may be used to identify a minimal non-uniform temporal sampling pattern for the object. In a similar manner, potentially rather complex motion trajectories and occlusion attributes can be determined for previously identified objects in the scene.

In the following description, specific details are given to provide a thorough understanding of the aspects. However, it will be understood by one of ordinary skill in the art that the aspects may be practiced without these specific details. For example, electrical components may be shown in block diagrams in order not to obscure the aspects in unnecessary detail. In other instances, such components, other structures and techniques may be shown in detail to further explain the aspects.

It is also noted that the aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1A:
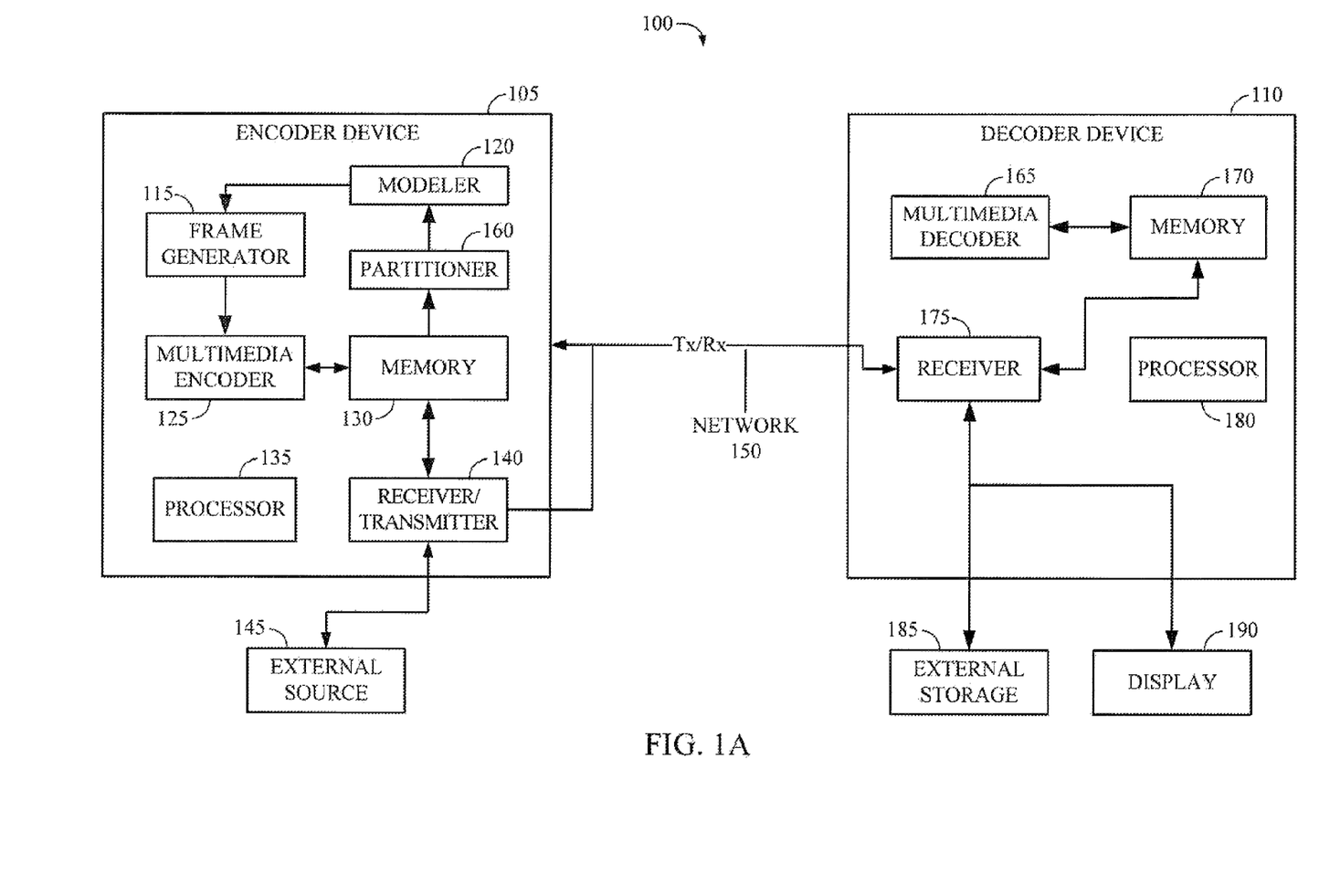
FIG. 1A is an illustration of an example of a communication system implementing an encoder assisted frame rate up conversion (EA-FRUC) system using various motion models in accordance with one aspect for delivery of streaming video.

FIG. 1A is an illustration of an example of a communication system implementing an encoder assisted frame rate up conversion (EA-FRUC) system using various motion models in accordance with one aspect for delivery of streaming video. System 100 includes encoder device 105 and decoder device 110.

The encoder device 105 includes a frame generator 115, a modeler 120, a partitioner 160, a multimedia encoder 125, a memory component 130, a processor 135, and a receiver/transmitter 140. Processor 135 generally controls the overall operation of the exemplary encoder device 105.

Partitioner component 160 partitions video frames into different blocks so that motion models may be associated with subset areas of the video frame. Analysis of motion-deformation information may be successfully used to segment the initial scene/frame and may be used to determine the minimal temporal sampling of frames that need to be compressed and transmitted, in contrast to frames which can be successfully interpolated based on the data of the transmitted ones. In certain aspects, the (minimal) number of sampling instances is based on when motion-deformation dynamics goes through changes. Proper frame interpolation may thus be executed based on an appropriate segmentation of the motion-deformation dynamics.

Modeler component 120 is configured to determine and associate motion models with objects found in video frames composing a scene.

Frame generator component 115 generates interpolated frames using data from the original video stream as well as information on the decoder that will be used to decode the data transmitted by the encoder device 105. Systems and methods for generating interpolated frames are discussed in U.S. Patent Publication No. 2006/0165176 titled "Method and apparatus for encoder assisted-frame rate up conversion (EA-FRUC) for video compression" which is hereby incorporated herein in its entirety.

The multimedia encoder 125 may include subcomponents including a transformer/quantizer component that transforms and/or quantizes video (or audio or closed caption text) data from the spatial domain to another domain, such as the frequency domain in the case of DCT (discrete cosine transform). The multimedia encoder may also include an entropy encoder component. The entropy encoder component may use a context-adaptive variable length coding (CAVLC). Encoded data may include quantized data, transformed data, compressed data, or any combinations thereof. Memory component 130 is used to store information such as raw video data to be encoded, encoded video data to be transmitted, header information, the header directory, or intermediate data being operated on by the various encoder components.

In this example, the receiver/transmitter component 140 contains circuitry and/or logic used to receive data to be encoded from external source 145. External source 145 could be, for example, external memory, the Internet, a live video and/or audio feed, and receiving the data can include wired and/or wireless communications. Transmitter 140 also contains circuitry and/or logic, e.g. a transmitter, to transmit (Tx) encoded data over Network 150. Network 150 can be part of a wired system such as telephone, cable, and fiber optic, or a wireless system. In the case of wireless communication systems, network 150 can comprise, for example, part of a code division multiple access (CDMA or CDMA2000) communication system or alternately, the system can be a frequency division multiple access (FDMA) system, an orthogonal frequency division multiple access (OFDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1×EV-DO or 1×EV-DO Gold Multicast) system, or in general any wireless communication system employing a combination of techniques. The transmitted data may include multiple bitstreams, such as video, audio and/or closed caption.

It should be noted that one or more elements of encoder device 105 shown in FIG. 1 may be omitted, rearranged and/or combined. For example, processor component 135 may be external of encoder device 105.

Decoder device 110 contains similar components as encoder device 105, including multimedia decoder 165, memory component 170, receiver 175, and processor 180. Decoder device 110 receives encoded multimedia data that has been transmitted over network 150 or from external storage 185. The receiver 175 contains circuitry and/or logic used for receiving (Rx) encoded data in conjunction with network 150, as well as logic for receiving encoded data from external storage 185. External storage 185 could be, for example, external RAM or ROM, or a remote server.

The multimedia decoder 165 contains circuitry and/or logic used in decoding the received encoded multimedia bitstreams. Subcomponents of the multimedia decoder 165 may include a dequantization component, an inverse transform component, and various error recovery components. The error recovery components may include lower level error detection and correction components (such as Reed-Solomon coding and/or Turbo-coding) as well as upper layer error recovery and/or error concealment used to replace and/or conceal data not correctable by the lower layer methods.

The decoded multimedia data can be displayed with display component 190, stored in external storage 185, or stored in internal memory component 170. Display component 190 can be an integrated part of the decoder device 110. The display component 190 contains such parts as video and/or audio display hardware and logic, including a display screen and/or speakers. The display component 190 may also be an external peripheral device. In this example, the receiver 175 also contains logic used to communicate the decoded multimedia data to external storage component 185 or display component 190.

It should be noted that one or more elements of decoder device 110 shown in FIG. 1 be omitted, rearranged and/or combined. For example, the processor 180 may be external of the decoder device 110.

Figure 1B:
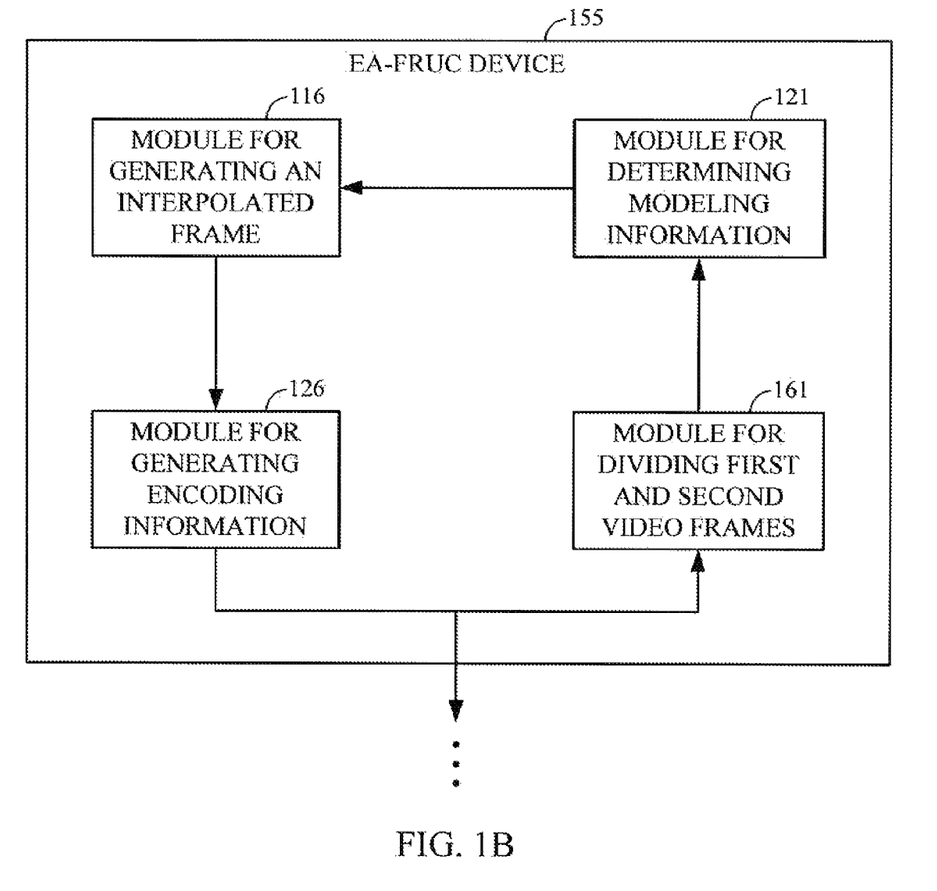
FIG. 1B is an illustration of an example of a EA-FRUC device configured to use various motion models in accordance with one aspect for delivery of streaming video.

FIG. 1B is an illustration of an example of a EA-FRUC device 155 configured to use various motion models in accordance with one aspect for delivery of streaming video. The EA-FRUC device 100 configured to use various motion models includes module for dividing first and second video frames 161, module for determining modeling information 121, module for generating an interpolated frame 116, and module for generating encoding information 126.

In one aspect, a means for dividing at least one of first and second video frames into a plurality of partitions comprises the module for dividing first and second video frames 161. In one aspect, a means for determining modeling information for at least one object in at least one of the plurality of the partitions includes the module for determining modeling information 121. In one aspect, a means for generating an interpolated frame based on the modeling information includes the module for generating an interpolated frame 116. In one aspect, a means for generating encoding information based on the interpolated frame includes the module for generating encoding information 126.

Figure 2:
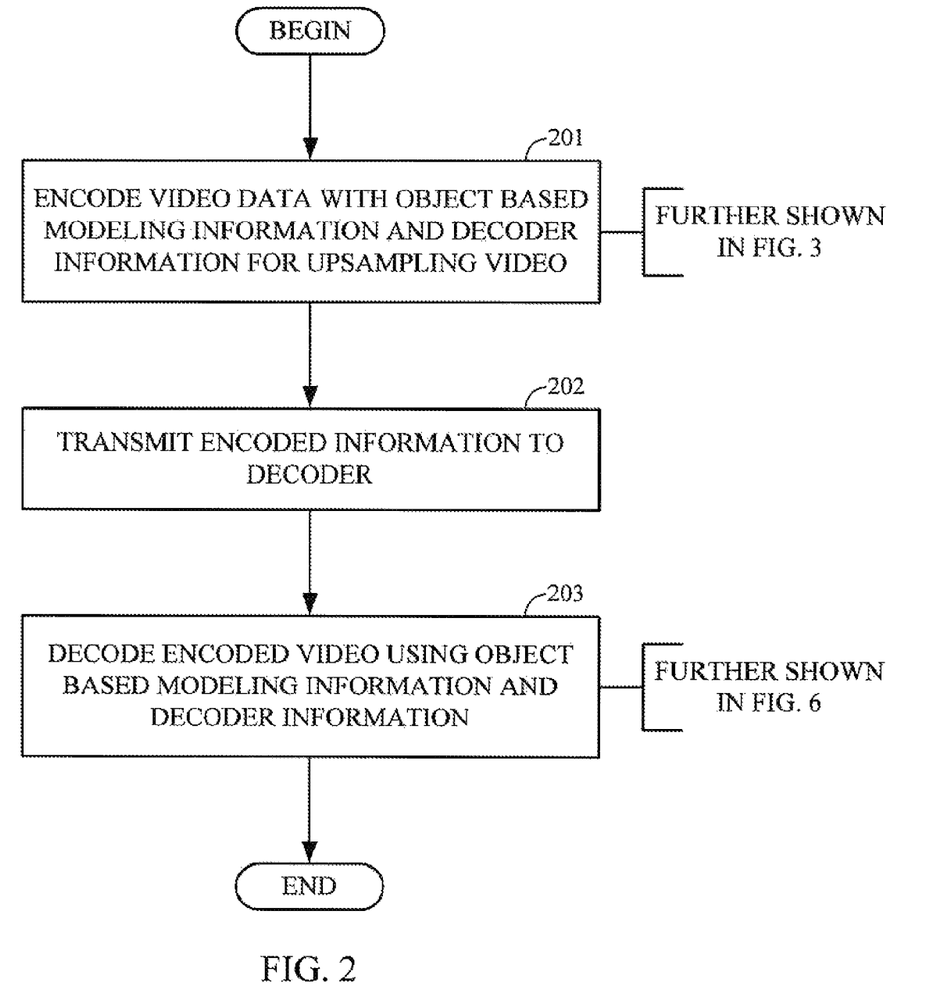
FIG. 2 is a flow diagram illustrating the operation of the EA-FRUC system of FIG. 1A configured to use various motion models.

FIG. 2 is a flow diagram illustrating the operation of the EA-FRUC system of FIG. 1A configured to use various motion models. First, at step 201, video data is encoded for upsampling using object based modeling information and information on the decoder device 110, as will be discussed in further detail with reference to FIG. 3. Next, at step 202, the encoded information is transmitted to the decoder device 110. In certain aspects, the encoded information is transmitted from the transmitter module 140 of the encoder device 105 to the receiver 175 of the decoder device 110. Upon receiving the encoded information, in step 203 the process completes when the decoder device 110 decodes the encoded information, reproducing a compressed version of the original video data using the encoded object based modeling information. Step 203 will be discussed in further detail with reference to FIG. 6.

Figure 3:
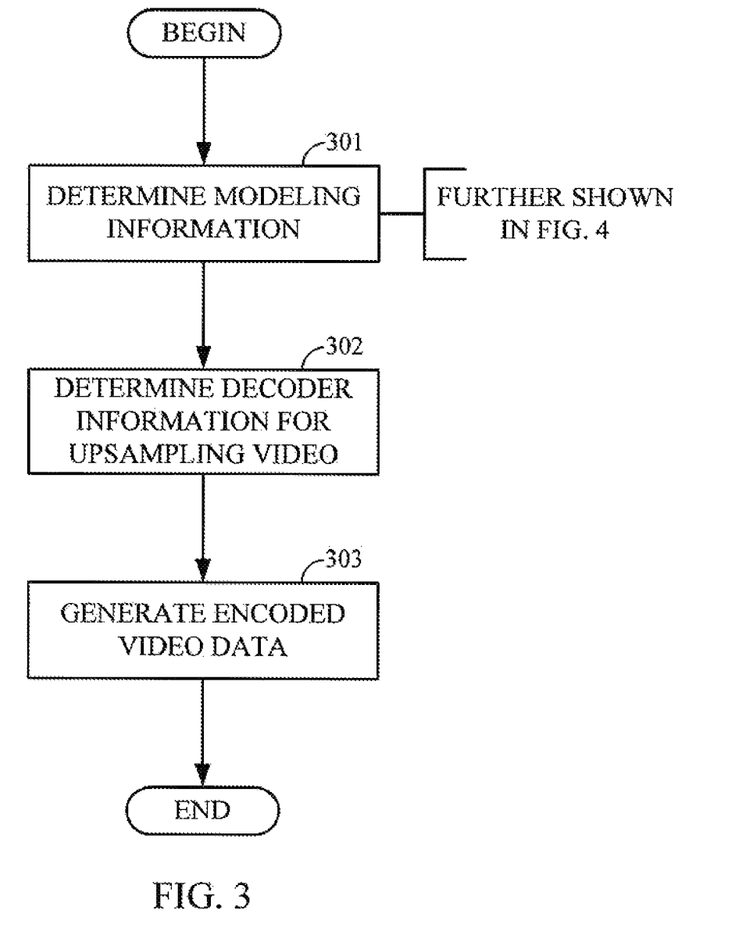
FIG. 3 is a flow diagram illustrating encoding video data for upsampling using object based modeling information and decoder information.

FIG. 3 is a flow diagram illustrating encoding video data for upsampling using object based modeling information and decoder information. First, in step 301, modeling information is determined for objects in a video frame, as discussed in further detail with reference to FIG. 4. Next, in step 302, information on the decoding system intended to be used to decode the encoded video data is used in order to further upsample the encoded video. Finally, in step 303, the encoded video bitstream is generated, as discussed in U.S. Patent Publication No. 2006/0002465 titled "Method and Apparatus for Using Frame Rate Up Conversion Techniques in Scalable Video Coding," which is hereby expressly incorporated by reference herein in its entirety.

Figure 4:
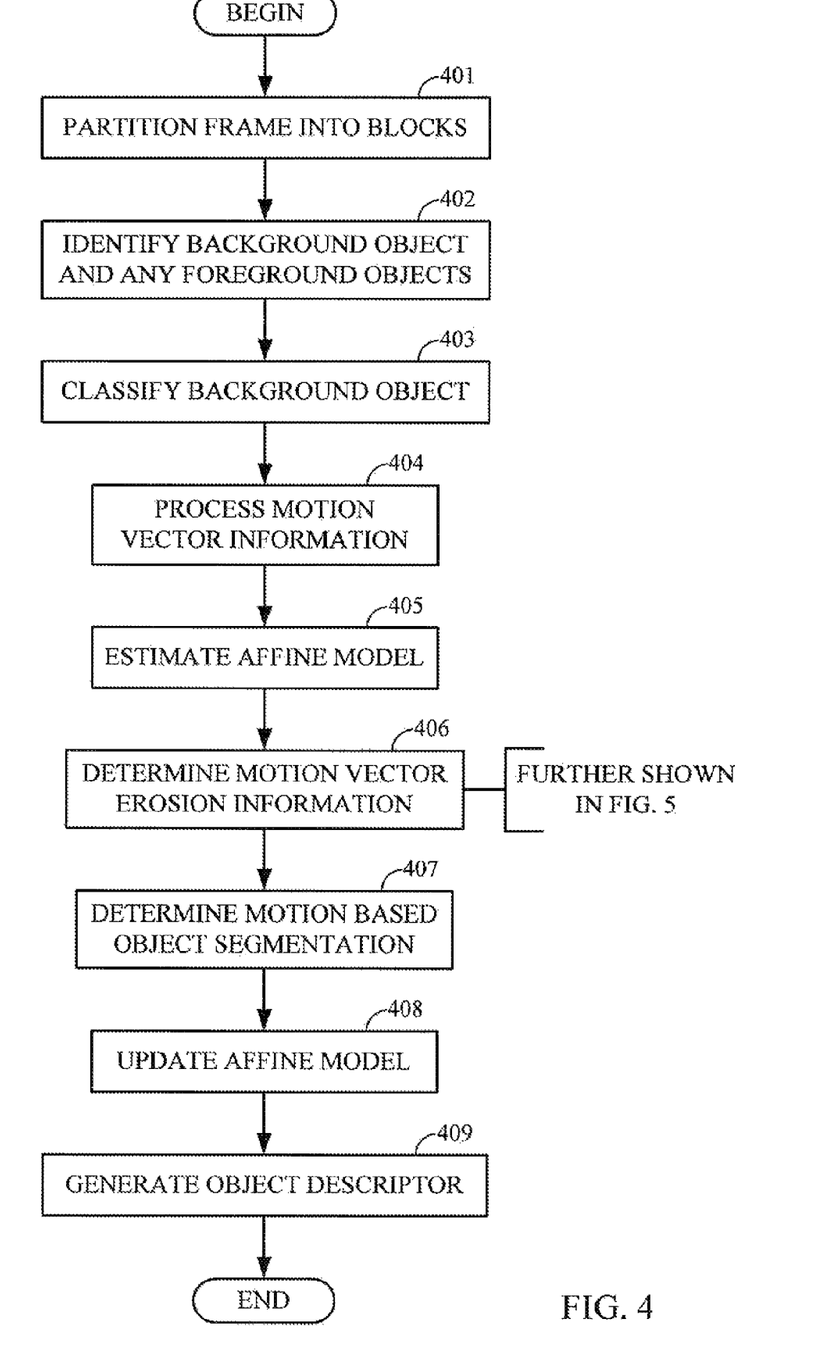
FIG. 4 is a flow diagram illustrating determining modeling information for objects in a video frame according to one aspect of the invention.

FIG. 4 is a flow diagram illustrating determining modeling information for objects in a video frame according to one aspect of the invention. In the aspect illustrated, moving objects are identified using certain advantageous techniques disclosed herein directed to recognizing objects undergoing arbitrary motions and deformations. In other aspects, objects may be identified by uniformly applying a motion-compensated prediction and transform coding based hybrid video compression scheme to each video frame as known in the prior art. Furthermore, in the aspect illustrated, the affine models used cover a portion of the video frame, commonly referred to as objected-based affine model or local GMC. In this case, the encoder device 105 performs object segmentation to locate objects in motion, which is then followed by updating the affine model estimation using both the affine model itself and the object descriptor. For example, a binary bitmap may indicate the boundary of the described object within a video frame. In aspects where an affine model covers the entire video frame, Global Motion Compensation (GMC) is used. For GMC cases, the six parameters used in affine model motioning are used to describe the motion of the frame, and are transmitted to the decoder device 110 without any other motion information embedded in the bitstream. In yet further aspects, motion models other than affine motion models may be used.

First, in step 401, the video frame is partitioned into blocks. In certain aspects, the blocks are of fixed size and shape. In other aspects, the frame may be partitioned into non-uniformly sized and/or non-uniformly shaped blocks, based on one or a combination of factors including prominent motion-deformation behaviors, temporal change dynamics within regions, uniquely identifiable objects.

Next, in step 402, one background object is identified and zero or more foreground objects are identified. In certain aspects, identification may be made using image segmentation. Image segmentation includes analyzing pixel domain attributes such as brightness and color values in conjunction with thresholding, as well as certain statistics of these attributes, such as mean, variance, standard deviation, min-max, median and others, in conjunction with region-based methods. In other aspects, identification may be made using texture models, such as Markov Random Fields or Fractals. In yet other aspects, identification may be made using edge/contour detection, including Watershed Transformations on gradient images, and shape models. In further aspects, identification may be made using connectivity-preserving relaxation-based segmentation methods, usually referred to as the active contour model. In other aspects, identification may be made using temporal information such as motion fields. In certain aspects, image segmentation may occur using a combination of some or all of the above image segmentation approaches within a unified framework.

In certain other aspects, the objects may be identified using graph-based techniques, such as using local and global, semantic and statistical (intensity/texture) grouping cues. In yet further aspects, identification of the above listed objects may be made using scene composition information available from the authoring-tool. In certain aspects, the background object and any foreground object may be identified using a combination of some or all of the above identification approaches within a unified framework.

Then, in step 403, the background object is classified. In certain aspects, the background object may be classified as a still image, in which case one transmission of the background object suffices for future frame interpolation and/or decoding/reconstruction tasks at the decoder device 110. In other aspects, the background object may be classified as a still (or almost static) image undergoing a global motion such as a pan, scroll, rotation, zoom-in or zoom-out motion. In this case, the encoder device 105 appropriately selects to transmit certain sample states of the background image in conjunction with a description of the global motion model. The transmission may suffice for frame interpolation and/or decoding/reconstruction tasks at the decoder device 110. In further aspects, the classification of the background object may not belong to either of the above two classes, in which case a potentially denser temporal sampling of the states of the background image may be transmitted by the encoder device 105 to support successful frame interpolation and/or decoding/reconstruction at the decoder device 110.

Next, in step 404, the motion vector information for the objects identified from the video data is processed. The motion vector information may be processed using the systems and methods disclosed in U.S. Patent Publication No. 2006/0018382 titled "Method and Apparatus for Motion Vector Processing," which is hereby expressly incorporated by reference herein in its entirety. In step 405, estimated affine models are associated with the moving objects. The affine model may be estimated based on at least the degradation in the performance of the piecewise planar motion vector field approximation. Each affine model associated with each identified moving object is specified in step 406 using motion vector erosion information, as discussed in further detail with reference to FIG. 5, and is then further specified in step 407 using motion based object segmentation. These further specifications are used to update each respective affine model in step 408, and finally the process completes in step 409 when object descriptors are generated for the affine models.

Figure 5:
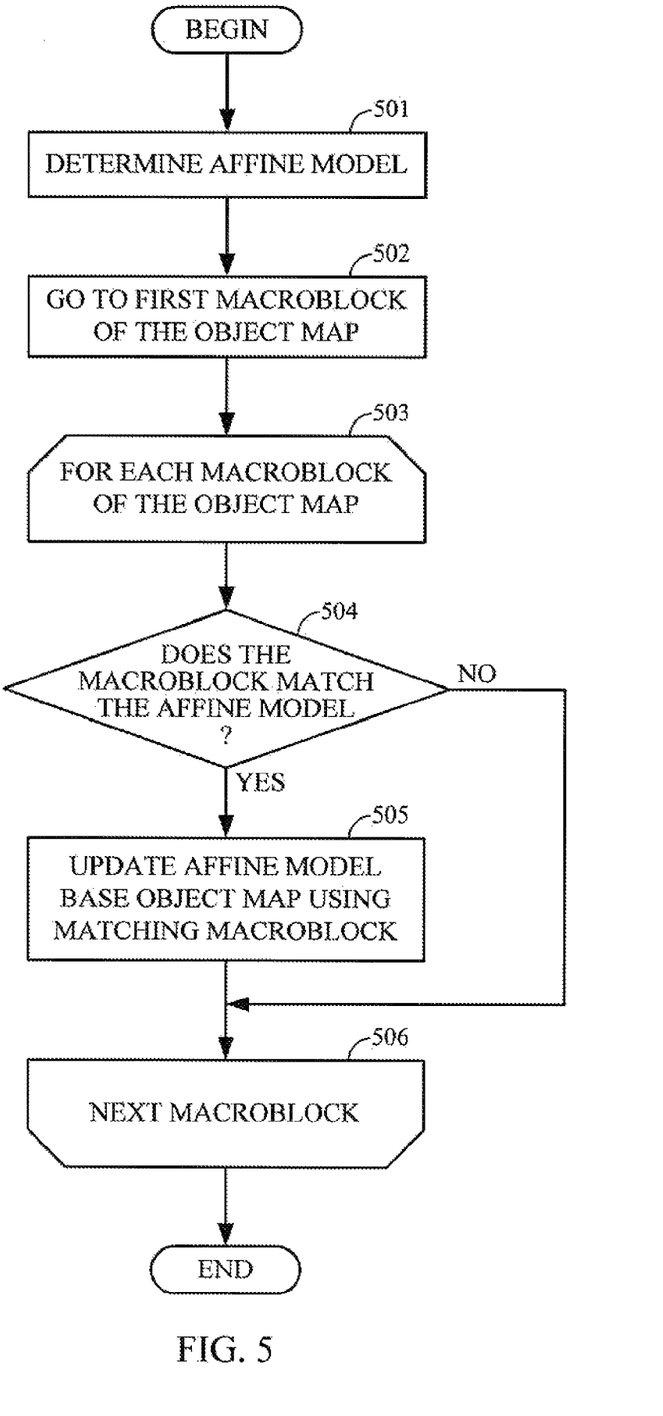
FIG. 5 is a flow diagram illustrating determining motion vector erosion information for objects in a video frame using affine models.

FIG. 5 is a flow diagram illustrating determining motion vector erosion information for objects in a video frame using affine models. First, in step 501, the encoder device 105 determines an affine model to associate with a moving object. The encoder device 105 then moves to the first macroblock of the object map for the video frame in step 502, where, in step 503, for each macroblock of the object map, the encoder device 105 decides whether the macroblock matches the determined affine model from step 501 in decision state 504. If the macroblock does match the affine model, the affine model base object map is updated using the matching macroblock in step 505. The encoder device 105 then proceeds to the next macroblock in step 506 by returning to step 503. If, however, the macroblock does not match the affine model, then the decoder device immediately proceeds to the next macroblock in step 506 by returning to step 503. Otherwise, the process is complete.

Although block based motion compensation using the translational model is widely deployed in decoder devices (whether software or hardware aspects of the devices), in order for EA-FRUC using different motion models to be implemented in decoder devices, motion information from the encoder device 105 is described within the translational block based motion vector framework. In certain aspects, the process of describing a different motion model in the translational block based motion framework of the decoder device 110 may be recursively executed for block motion vectors of smaller block sizes in order to create a motion vector for a larger block size.

Using information on the motion model encoded within the video bitstream, the decoder device 110 generates motion vectors for selected moving objects using a portion of the number of pixels used to display the object in the original video. In certain aspects, the selected pixels can be evenly distributed within the block. In other aspects, the pixels can be randomly selected from the block.

In certain aspects, the plurality of motion vectors of the block are then merged to produced a single motion vector representing the block, and that motion vector may further be subjected to post-processing, such as vector smoothing, as described above. In other aspects, a selected pixel or object's motion vector can be used as the seed motion vector for a motion estimation module in order to generate the motion vector representative for the block of interest.

Figure 6:
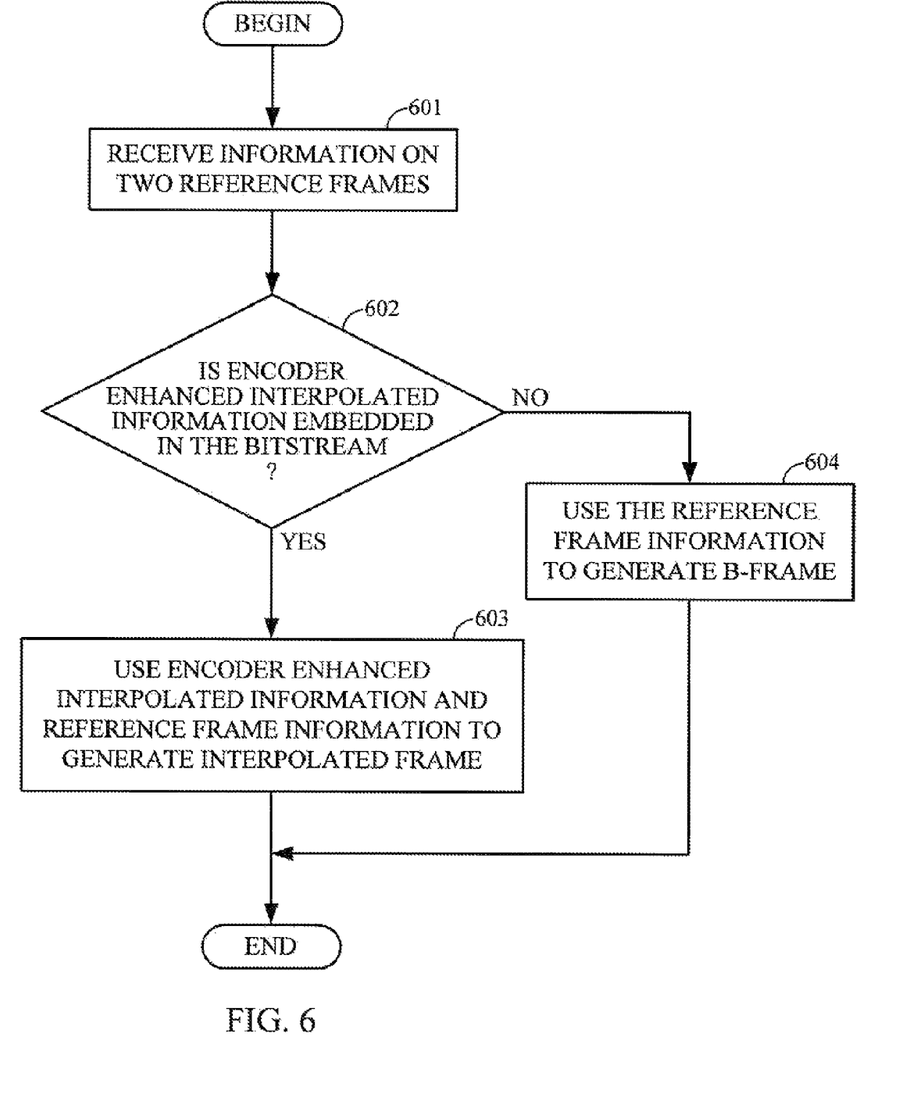
FIG. 6 is a flow diagram illustrating decoding encoded video data bitstream upsampled using object based modeling information and decoder information using a decoder device configured to decode motion models within the translational motion model framework according to certain aspects of the invention.

FIG. 6 is a flow diagram illustrating decoding encoded video data bitstream upsampled using object based modeling information and decoder information using a decoder device configured to decode motion models within the translational motion model framework according to certain aspects of the invention.

In step 601, the decoder device 110 receives encoded information for a video bitstream including two reference frames. Next, in decision state 602, the decoder device 110 decides whether the bitstream includes an encoder enhanced interpolated frame. If an encoder enhanced interpolated frame is included, then in step 603 the decoder device uses the interpolated frame, which includes encoder enhanced information relating to various motion models, in addition to a reference frame to generate a video frame temporally co-terminal with the interpolated frame. In other words, the decoder device uses the encoder enhanced interpolated frame along with its associated reference frame in order to generate a video frame that takes the place of the interpolated frame. If, however, in step 602 the decoder device 110 decides that encoder enhanced interpolated frame information is not embedded in the bitstream, then the decoder device 110 in step 604 will use a reference frame to generate a bi-directional frame (B-frame).

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus.

What is claimed is:

1. A method of processing multimedia data comprising:
dividing at least one of first and second video frames into a plurality of partitions;
determining modeling information for at least one object in at least one of the partitions, said modeling information being associated with the first and second video frames;
generating an interpolated frame based on the modeling information; and
generating encoding information based on the interpolated frame, wherein the encoding information and a reference frame are used for generating a video frame temporally co-located with the interpolated frame.

2. The method of claim 1, wherein determining model information for at least one object in one of the partitions comprises:
determining a block based motion field estimation;
identifying at least one object based on the block based field estimation; and
determining an affine model for the at least one object.

3. The method of claim 1, further comprising using color features to identify boundaries of the at least one object.

4. The method of claim 1, further comprising using texture features to identify boundaries of the at least one object.

5. The method of claim 1, further comprising using pixel domain attributes to identify boundaries of the at least one object.

6. The method of claim 1, further comprising: determining motion vector erosion information associated with one of the partitions, wherein the transmitted encoding information comprises the motion vector erosion information.

7. The method of claim 1, wherein the modeling information comprises an affine model.

8. The method of claim 7, wherein the affine model comprises at least one of translation, rotation, shearing, and scaling motion.

9. The method of claim 1, wherein the modeling information comprises a global motion model.

10. An apparatus for processing multimedia data comprising: means for dividing at least one of first and second video frames into a plurality of partitions; means for determining modeling information for at least one object in at least one of the plurality of the partitions, said modeling information being associated with the first and second video frames; means for generating an interpolated frame based on the modeling information; and means for generating encoding information based on the interpolated frame, wherein the encoding information and a reference frame are used for generating a video frame temporally co-located with the interpolated frame.

11. The apparatus of claim 10, wherein said determining means comprises: means for determining block based motion field estimation; means for identifying at least one object based on the block based field estimation; and means for determining an affine model for the at least one object.

12. The apparatus of claim 10, further comprising using color features to identify boundaries of the at least one object.

13. The apparatus of claim 10, further comprising using texture features to identify boundaries of the at least one object.

14. The apparatus of claim 10, further comprising using pixel domain attributes to identify boundaries of the at least one object.

15. The apparatus of claim 10, further comprising: means for determining motion vector erosion information associated with one of the partitions, wherein the transmitted encoding information comprises the motion vector erosion information.

16. The apparatus of claim 10, wherein the modeling information comprises an affine model.

17. The apparatus of claim 16, wherein the affine model comprises at least one of translation, rotation, shearing, and scaling motion.

18. An apparatus for processing multimedia data comprising:
a partitioning module configured to divide at least one of first and second video frames into a plurality of partitions;
a modeling module configured to determine modeling information for at least one object in at least one of the plurality of the partitions, said modeling information being associated with the first and second video frames;
a frame generation module configured to generate an interpolated frame based upon the modeling information;
an encoding module configured to generate encoding information based upon the interpolated frame, wherein the encoding information and a reference frame are used for generating a video frame temporally co-located with the interpolated frame; and
a transmission module configured to transmit the encoding information to a decoder.

19. A non-transitory machine readable medium comprising instructions for processing multimedia data, wherein the instructions upon execution cause a machine to:
divide at least one of first and second video frames into plurality of partitions;
determine modeling information for at least one object in at least one of the plurality of the partitions, said modeling information being associated with the first and second video frames;
generate an interpolated frame based on the modeling information; and
generate encoding information based on the interpolated frame, wherein the encoding information and a reference frame are used for generating a video frame temporally co-located with the interpolated frame.

20. A processor for processing multimedia data, said processor being configured to:
divide at least one of first and second video frames into a plurality of partitions;
determine modeling information for at least one object in at least one of the plurality of the partitions, said modeling information being associated with the first and second video frames;
generate an interpolated frame based on the modeling information; and
generate encoding information based on the interpolated frame, wherein the encoding information and a reference frame are used for generating a video frame temporally co-located with the interpolated frame.

* * * * *